United States Patent Office 3,500,196
Patented Mar. 10, 1970

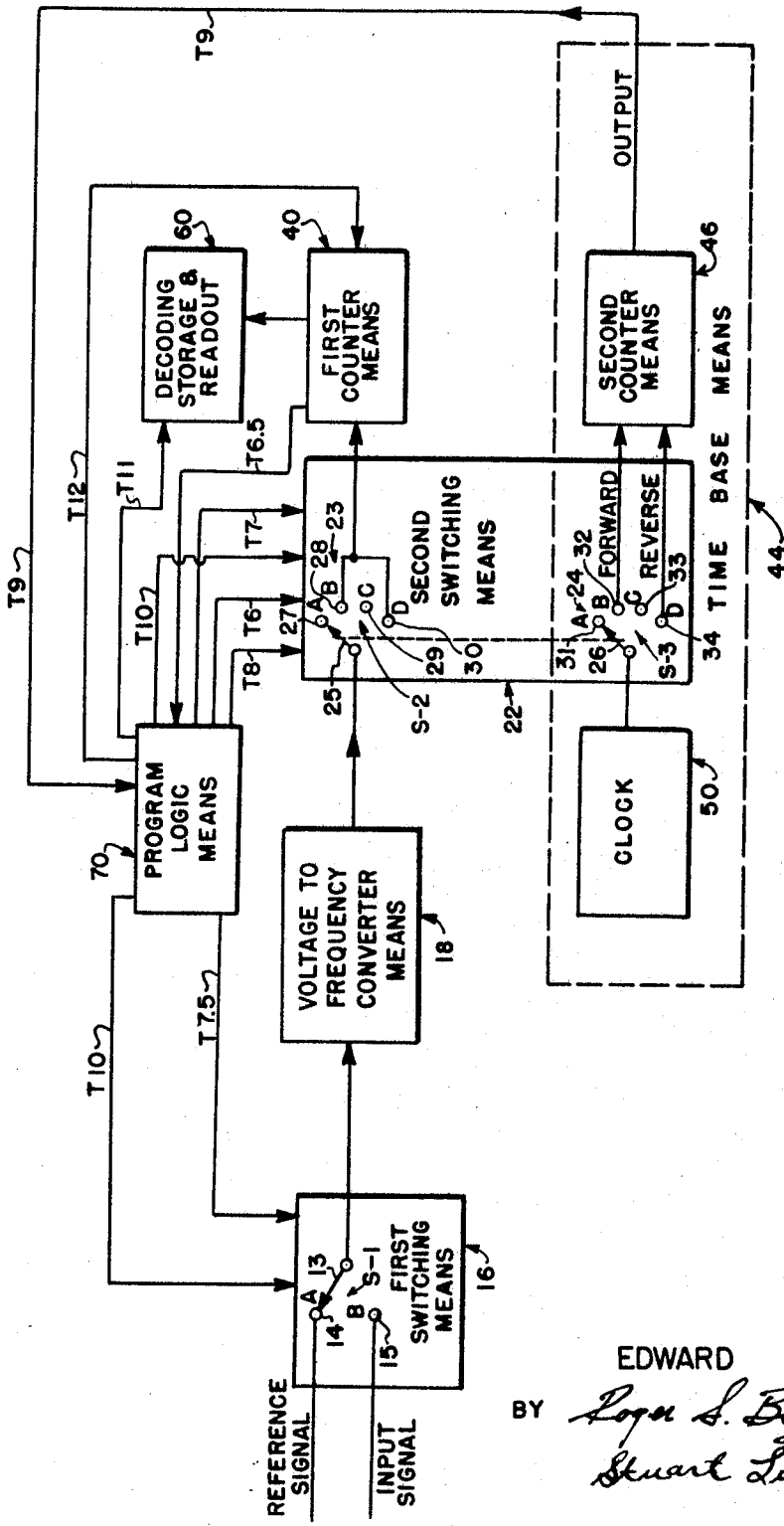

3,500,196
DIGITAL VOLTAGE MEASURING INSTRUMENT HAVING A VARIABLE TIME BASE DETERMINED BY A REFERENCE SIGNAL
Edward Cooper, Palo Alto, Calif., assignor, by mesne assignments, to Systron-Donner, Concord, Calif., a corporation of California
Filed Mar. 20, 1967, Ser. No. 624,466
Int. Cl. G01r 19/26, 1/02; H03k 13/20
U.S. Cl. 324—120                                        3 Claims

ABSTRACT OF THE DISCLOSURE

This invention relates to an instrument, and in particular, to a digital instrument such as employed for measuring a voltage. The instrument employs a controlled time base wherein this time base is arrived at by the processing of a reference signal through a processing channel. This channel is at least partly employed during the measuring of an unknown signal along with the determined time base.

BACKGROUND OF THE INVENTION

For the purpose of a meaningful explanation, the discussion of the invention which follows is directed toward the use of the invention as a digital voltmeter. The invention gives rise to particularly significant advantages in this environment. However, the broader aspects of the invention find application in other instruments and uses.

Broadly, a digital voltmeter is an instrument which has an unknown analogue voltage as an input signal and provides an output manifestation in the form of a digital representation having a magnitude related to the unknown input voltage. Such instruments have generally employed three techniques:

(1) Ramp or slope;
(2) Integrating; and
(3) Potentiometric or successive approximation.

Briefly, the ramp method type voltmeters measure the length of time that it takes an internally generated ramp voltage with a precisely known slope, starting from a known level to become equal to an unknown input voltage. Typically, when the ramp voltage is at a ground potential, a first comparator generates a pulse that opens a gate and a second comparator generates a pulse which closes the gate when the ramp voltage and the unknown voltage coincide. While the gate is open, a train of pulses pass from a fixed frequency oscillator to a counter. The number of pulses counted while the gate is open is proportional to the unknown input voltage.

The integrating digital voltmeter employs a voltage to frequency converter which has an unknown input signal connected thereto and which in turn has its output connected to a counter via a gate. The gate is controlled by the signal from a fixed gate time generator (generally called "Time Base Generator"). In operation, the unknown input voltage is converted to a proportional frequency which is gated to the counter for a fixed period of time by the fixed gate time generator. In comparing the integrating digital voltmeter to the ramp-type digital voltmeter, it can be seen that the frequency of the ramp-type device is fixed while the time is variable in accordance with the time required for the ramp voltage to equalize the unknown voltage. In the integrating type of digital voltmeter, a fixed time interval is employed with a variable frequency from the converter which varies according to the magnitude of the input signal.

The other broad class of digital voltmeters is the potentiometric type, which employs some type of comparator amplifier, logical programmer and precision programmable power supply all connected in a closed loop. The comparator amplifier receives the input signal and the programmed power supply is connected to the comparator amplifier to balance out or null the unknown input signal. In operation, the comparator amplifier drives the logical programmer which in turn adjusts the programmable power supply to null out the unknown voltage at the comparator's input. The final setting of the power supply provides a digital readout which is proportioned to the input voltage.

The above types of digital voltmeters, as well as other variations of such voltmeters are discussed in detail in the article "Selecting the Right Digital Voltmeter," published in Electronics, Apr. 4, 1966, pages 84–90. In U.S. Patent No. 3,051,939 issued on Aug. 28, 1962, to R. W. Gilbert and U.S. Patent No. 3,149,282 issued on Sept. 15, 1964 to P. D. Wasserman, other forms of digital voltmeters are described.

These prior art voltmeters are in general graded according to accuracy, resolution, sensitivity, stability, reading rate and noise rejection. Of these criteria noise rejection, stability and reading rate are good indicators of over-all voltmeter performance. The ramp-type digital voltmeters are limited in accuracy because of their dependance on linearity and stability of the ramp and have poor noise rejection characteristics. The noise rejection characteristic can be improved by filtering techniques. However, this tends to degrade the instrument's maximum reading rate. With the integrating type of digital voltmeter, the accuracy attainable is better as compared to the ramp-type. This arises mainly from the inherent noise rejection characteristic of the integrating type of system. This characteristic arises from the fact that the integrating type of voltmeter measures the unknown for a given time interval allowing various noise frequencies to achieve a cancelling effect. The integrating-type of digital voltmeter has the drawback, however, that the voltage to frequency converter does not operate in the linear manner over a large range of frequencies. For example, as a practical matter, it is difficult to obtain a voltage to frequency converter with a maximum frequency of in excess of 500 kc. This maximum frequency also limits the reading rate as the time required to achieve a full-scale count, which in turn determines the reading rate and is inversely proportional to the maximum frequency of the voltage to frequency converter. Thus, in the integrating type of digital voltmeter, the converter non-linearity, stability and relationship to reading rate present formidable design problems.

The potentiometric type of voltmeter has its accuracy and stability largely dependent upon the reference power supply employed to null the input voltage. While the full-scale stability of the power supply is more easily controlled than that of a voltage to frequency converter, the linearity of switching devices in such power supplies present critical temperature control and stability problems. This problem may be solved by placing the critical elements in an oven of some sort. The more difficult limitation on the potentiometric voltmeter is its inability to reject noise. Thus, the potentiometric voltmeter must compromise between reading rate and noise rejection by filtering techniques.

With respect to digital voltmeters the present invention provides an instrument which has the advantages of the integrating type of voltmeter, but overcomes many of the disadvantages of the voltage to frequency converter employed therein.

SUMMARY OF THE INVENTION

Briefly, the invention comprises: measuring means for measuring an electrical signal, said means including a channel for processing said signal for a time period; and time base means for determining said time period, said time base means including at least part of said first channel and coupled to said measuring means to cancel out variations in said channel operations, whereby an instrument is provided having stability and linearity.

BRIEF DESCRIPTION OF THE DRAWING

The principles of this invention can be readily understood by reference to one specific embodiment described in detail in the description which follows and is shown in sole drawing which is a block diagram of a digital voltmeter incorporating this invention.

DETAIL-DESCRIPTION

Referring to the figure, a reference signal and an input signal are coupled to frequency converter means 18 by a first switching means 16. The reference signal is a signal having a first value which in general may be a voltage having a predetermined value. The input signal is an unknown signal which in a digital voltmeter would be an analogue voltage signal having an unknown value. The first switching means 16 has at least two switching states A and B which, as shown in the figure, is represented by a switch-arm 13 capable of abutting contacts 14 and 15 respectively. It is understood that the first switching means may be an appropriate type of switching device, for example, a solid state switching device.

The frequency converter means 18, when the invention is employed in a digital voltmeter, is a voltage to frequency converter which generates output pulses that are linearly proportional in repetition rate, i.e., frequency, to the voltage level at the input of converter means 18. Such devices are well known in the art. In operation, converter means 18 will provide pulses at a repetition rate proportional to the reference voltage when the switching means 16 is in switching state A and will provide pulses at a repetition rate proportional to the unknown signal when switching means 16 is in switching state B.

The output pulses from the voltage to frequency converter means 18 are coupled to a first counter means 40 via a portion of second switching means 22. The second switching means 22 is shown schematically as a pair of mechanical switches 23 and 24, each having four switching states A through D. The switches 23 and 24 include switching arms 25 and 26 which move across the contacts 27 to 30 and 31 to 34 in sequence and in synchronism, respectively. Each pair of contacts 27 and 31, 28 and 32, etc., are representative of a different state A through D. Frequency converter means 18 is connected to the first counter means when switch 23 is in switching states B and D, that is, when arm 25 abuts contacts 28 and 30, respectively. It is understood that the second switching means may be any appropriate switching device such as a solid state switching device.

First counter means 40 is a digital counter which accumulates pulses from the frequency converter means 18 and provides an electrical output representative of the value stored therein to be employed in a digital read-out device or other type of recording device. In addition, the first counter means 40 provides a control signal whenever it reaches a full-scale count which is connected to program logic means 70 by line $T_{6.5}$. It should be understood that the lines ($T_6$, $T_7$, etc.) connecting the various elements to the program logic are not intended to indicate separate or individual conductors but are only for purposes of illustration to indicate various functional control and cooperation. Interconnection may exist by one or more conductors, coupling or physical effects. Program logic means 70 is an electronic logic circuit which controls the overall operation of the system. The program logic means may be constructed from binary counters, logic gates, and other similar logic devices which may be organized in many efficient ways according to well known techniques once the basic functions of the system are defined. The program logic means 70 is coupled to first switching means 16, second switching means 22, and first counter means 40. It is also coupled to a second counter means 46, a read-out means 60, and a time base means 44. The exact purpose of these interconnections along with the control functions of the program logic will be described later in the specification in connection with the operation of the system.

The time base means 44 performs the function of controlling the time of operation of first counter means 40 and more generally, the processing channel formed by converter means 18, switch 22, and first counter means 40 as well as any other circuitry which it may be desired to include in the channel. As contrasted with well-known integrating digital voltmeters, the time control provided by time base means 44 is not fixed, but variable from reading to reading and more important, varied to calibrate the instrument. This variable control will be described later in the specification with reference to the operation of the digital voltmeter.

The time base means 44 in this embodiment comprises a clock 50 which generates pulses at constant repetition rate with good short-term stability. Typically, this may be a crystal controlled oscillator. The output from clock 50 is coupled to second counter means 46 by a portion of second switching means 22 which has been previously designated as switch 24. Pulses are transmitted to the second counter means 46 by switch 24 when the switch is in switching states B and D, that is, when switch arm 26 abuts contacts 32 and 34. Thus, when converter means 18 is supplying first counter means 40 with pulses, the clock 50 will be supplying pulses to the second counter means 46. The second counter means 46 may be either bidirectional or may consist of two individual counters with a coincidence comparator between them. It should be noted that the two-counter and comparator embodiment allows a plurality of sequential measurements without the need for recalibrating with another reference signal. This is particularly useful when the invention is to be used in an add or subtract system. With the bidirectional counter whenever it reaches zero (or in a two-counter arrangement the comparator detects coincidence), a zero or stop output signal will be provided which is coupled to program logic means 70 via $T_9$. The program logic 70 in turn provides a signal via one of the lines $T_{10}$ to switch means 22 which operates this means to disconnect the inputs to the counter means 40 and 46. It should be understood that it is within the scope of the invention to connect the stop output from second counter means 46 to other elements in the channel to stop the measurement.

Second counter means 46 (assuming a bidirectional counter) will operate in a forward direction when pulses are supplied by clock 50 via switching state B (e.g., switch arm 26 abutting contact 32) and will operate in a reverse direction when switch 24 is in switching state D (e.g., switch arm 26 abutting contact 34). Thus, when switch 23 is in switching state B and first counter means 40 is receiving pulses from converter means 18, switch 24 will be in switching state B and receiving the pulses from clock 50 to drive the second counter means 46 in a forward direction. When switch 23 is in switching state D and first counter means 40 is receiving pulses from converter means 18, the clock 50 will supply pulses via switch 24 which is in switching state D to operate the second counter means 46 in a reverse direction. In the embodiment employing two counters and a comparator as the second counter means, there is no reverse direction. Initially, one counter is operated, then a second counter is operated until coincidence is achieved to provide the stop signal.

With the above structure in mind, the operation of the digital voltmeter may now be considered. In connection with the description, the lines coupling program logic means 70 with the other elements are designated with a T and subscript wherein the subscripts, which start with 6 are indicative of the approximate sequence of operation of the program logic means. For example, first a signal is provided over lines $T_6$, then $T_{6.5}$ and so on. This sequence is only exemplary. At the start of the operation, switching means 16 has its switch arm 13 abutting contact 14 so that reference signal means 10 is connected to converter means 18 and the converter means 18 is generating pulses at a repetition rate proportional to the magnitude of the reference voltage. The second switching means 22 is initially in switching state A with all counters being set to zero. Some automatic control signal or manual means such as a push button is then operated which causes program logic means 70 to provide a signal along line $T_6$ which activates switching means 22. The switching means 22 is then set to switching state B by the signal along line $T_6$ between the program logic means and the second switch means. Thus, pulses are simultaneously supplied to first counter means 40 by converter means 18 and to second counter means 46 by clock 50. The two counter means will then start accumulating pulses until first counter means 40 reaches a full-scale count. At the full-scale count first counter means 40 provides an output signal which is coupled to program logic means 70 via line $T_{6.5}$. The program logic means 70 in turn instantly supplies a signal via $T_7$ which places second switching means in C state, thus stopping both counters, and resetting first counter means 40 to "zero" as indicated. (Resetting may be inherent in the counter on reaching full-scale count or the signal indicated at $T_7$ may be engaged for this purpose.) In switching state C both of the counters 40 and 46 are inoperative. It should be recognized at this point in the operation of the instrument second counter means 46 has stored therein a signal or value representative of the time required for first counter means 40 to reach a full scale condition. This signal stored in second counter means 46 serves as a time base for the subsequent measurement of the unknown signal supplied by an input signal means. It should also be recognized that the time base stored in second counter means 46 can be adjusted by changing the reference voltage, as the absolute time which is stored will change directly with any change in reference voltage.

With the time base determined, first switching means 16 is placed in switching state B and after a short waiting period (e.g., 5–20 milliseconds) to stabilize the converter means, the second switching means 22 is placed in state D. This is accomplished by program logic 70 supplying signals via lines $T_{7.5}$ and $T_8$, respectively. An unknown input voltage is now supplied to converter means 18. The unknown input voltage results in converter means 18 supplying pulses to first counter means 40 at a rate of repetition proportional to the level or magnitude of the unknown input signal, while the clock 50 steps second counter means in a reverse direction towards zero (or toward coincidence). As soon as second counter means 46 reaches its zero state (or equal state), a control signal is generated, i.e., the stop signal, which is supplied to program logic means 70 via line $T_9$ which results in program logic means 70 virtually instantaneously supplying a signal over line $T_{10}$ to second switch means 22 which stops both counters by connecting switches 23 and 24 to switching state A. A line $T_{10}$ also results in switching means 16 being reconnected to switching state A so that frequency converter means 18 can stabilize for the next measurement. A short time later, the count from the first counter means 40 is read out therefrom by read-out means 60 as enabled by a signal from program logic means 70 along line $T_{11}$. After a short delay, counter means 40 is reset to zero via a signal over line $T_{12}$. The value read-out from the first counter means is representative of the magnitude of the input signal and once this value is stored in read-out means 60, the system is ready for another measurement.

The fact that the resultant reading is representative of the magnitude of the unknown input signal is derived from the relationship that the signal in first counter means is the ratio of the unknown input signal to the reference signal. By properly selecting this ratio a digital voltmeter may be provided. This relationship can be further understood by a simplified mathematical explanation, wherein:

T=Time period
Subscript 1=First part of measurement i.e., reference sampling
Subscript 2=Second part of measurement i.e., unknown input sampling
N=Number of pulses accumulated in the first counter means
$V_R$=Reference voltage
$V_S$=Unknown input voltage
K=Conversion factor of converter means.

With these symbols in mind, $$T_1 = N_1 \cdot \frac{1}{V_R \cdot K_1} \tag{1}$$

and $$N_1 = T_1 \cdot V_R \cdot K_1 \tag{2}$$

Is similarly $$N_2 = T_2 \cdot V_S \cdot K_2 \tag{3}$$

Since a digital time base is employed the period of $T_2$ is equal to $T_1$:

$$T_2 = T_1$$

Therefore, Equation 3 becomes $$N_2 = T_1 \cdot V_S \cdot K_2 \tag{4}$$

Both measurements ($T_1$ and $T_2$) are made in rapid succession. Therefore, it can be assumed that the conversion factor $K_2$ is equal to $K_1$:

$$K_2 = K_1$$

Substituting $K_1$ in Equation 4 it becomes $$N_2 = T_1 \cdot V_S \cdot K_1 \tag{5}$$

Now substituting Equation 1 for $T_1$ in Equation 5

$$N_2 = N_1 \cdot \frac{1}{V_R \cdot K_1} \cdot V_S \cdot K_1$$

And simplifying $$N_2 = N_1 \cdot \frac{V_S}{V_R} \tag{6}$$

Equation 6 shows that $N_2$ (the number displayed in the digital readout) is the ratio of the unknown input voltage to the reference voltage, multiplied by the scale factor $N_1$. $N_1$ is defined as a full-scale count on the first counter means so it can be changed to $10^x$ and Equation 6 becomes $$N_2 = \frac{V_S}{V_R} \cdot 10^x \tag{7}$$

If a suitable reference voltage is chosen, the above-described ratiometer becomes a voltmeter, e.g., a 10V reference substituted in Equation 6 yields $$N_2 = N_1 \cdot \frac{V_S}{10}$$

$$N_2 = \frac{N_1}{10} \cdot V_S \tag{8}$$

Again substituting a full-scale number for $N_1$ so that $N_1 = 10^x$, Equation 8 becomes $$N_2 = \frac{10^x}{10} \cdot V_s$$

$$N_2 = 10^{x-1} \cdot V_s \qquad (9)$$

Equation 9 shows that the number $N_2$ displayed in the digital readout is the unknown input voltage. The analysis above shows that long-term stability of the system described above is independent of conversion factor and clock stabilities since these are self-cancelling in every measurement cycle. In the above detail description it can be seen that long term and temperature stability is only a function of the reference voltage characteristic. Non-linearity and aging affects of the converter means and clock are cancelled out in every measurement cycle. In addition, the storing of time base information in digital counters permits a waiting period between various steps of the measurement cycle. This waiting period eliminates any inaccuracy problems which result from switching transients and stabilizing time. The automatic adjustment of the time base for a wide range of reference voltages provides a system with extreme flexibility and enables the operation of the system to be readily tailored to the particular noise characteristic desired.

The invented instrument also provides excellent resolution at a relatively low cost compared to other techniques. If the first counter means is made bidirectional, the measurement of the unknown signal can be truely integrating with no cross-over error.

While the above description advantage relates primarily to the operation of the invention as a digital voltmeter, it should be appreciated that the invention has many other applications. For example, it may function as a ratiometer by substituting an unknown voltage for the reference signal, or analogue-to-digital converter and more generally, of the embodiment shown in FIGURE 1, may be modified to perform an add or subtract function.

In general the main modifications for performing an add function is the addition of input positions on switching means 16 so that several unknown inputs may be selected sequentially. The second counter means 46 also requires modification in that it may be replaced by two individual counters ($46_a$ and $46_b$) with a coincidence detector connected between them. These two counters have individual reset inputs so that one of them ($46_a$ forward input) can store the digital time base while the other counter ($46_b$ reverse input) can be to repeat the time base several times. For each repetition the counter $46_b$ is first reset to "O . . . O," the input switch is then advanced to the next unknown input signal, and after a brief waiting period for stabilizing purposes, the switching means 22 is connected simultaneously to switching state D. The first counter means 40 will again accumulate pulses from the converter means (in fact, it is adding these pulses to the number which was stored from the previous measurement), while the counter means $46_b$ accumulates pulses from the clock. Whenever the comparator detects coincidence between the $46_a$ and $46_b$ counters, it generates a control signal ("zero" output) which causes switching means 22 to connect simultaneously to switching state A. The final number which is displayed in counter means 40 is the sum of the unknown input voltages.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:
1. A digital instrument comprising:
input signal terminals for providing a reference input signal and an input signal to be measured;
a converter means coupled to said terminals for converting a signal applied thereto to a frequency signal having a frequency proportional to the magnitude of the applied signal;
first switching means for selectively and successively applying to said converter means the reference input signal and then the input signal to be measured to enable said converter means to selectively provide a frequency signal proportional to the reference input signal and then a frequency signal proportional to the signal to be measured;
a first counter means for providing a count proportional to the frequency of each output generated by said converter means and for providing an output signal when a predetermined count exists in said counter; and
a time base means for computing the time required for said counter means to achieve said predetermined count with said converter means coupled to the reference input signal, for storing said computed time, and for maintaining said first counter means operative for said computed time during a subsequent counting operation when said converter means is coupled to the input signal to be measured, so that the time base is determined by the reference signal and the accuracy of the instrument is substantially uneffected by the instability and non-linearities of the converter means.

2. The instrument recited in claim 1 wherein said time base means comprises:
a standard clock source means for generating pulses at a constant rate of repetition; and
a second counter means for counting the number of pulses generated by said clock means and for providing a stop signal when a predetermined reading occurs; said instrument further defined by
switching means having a plurality of switching states coupling said converter means to said first counter means and a plurality of switching states coupling said clock means to said second counter means, said switch means adapted to connect said converter means to said first counter means in synchronization with the connecting of said clock source means of said time base means to said second counter means during a preselected portion of the operation of the instrument.

3. An instrument for measuring the magnitude of an input signal comprising:
a first switching means providing a pair of input terminals, one for a reference signal and the other for an unknown signal to be measured, and a switch for selecting between the two terminals;
a voltage-to-frequency converter coupled to the first switching means, the converter capable of generating a frequency signal proportional to the magnitude of a signal applied thereto;
first and second counters, each capable of providing a count proportional to the number of cycles of a signal applied thereto, the second counter capable of operation as a bidirectional counter and having a pair of input terminals, one for counting in the forward direction and the other for counting in the reverse direction;
a second switching means comprising two parts, one part selectively coupling the output of the voltage-to-frequency converter to the input of the first counter;
a clock source capable of providing a predetermined number of pulses within a given time period, the second part of the second switching means selectively coupling the clock output to the pair of input terminals of the second counter;
program logic means coupled between the output of the first and second counters and the first and second switching means for controlling the operation of the instrument, whereby when a reference signal is applied to the first switching means, the two counters perform counting functions until the first counter reaches full count, whereupon the first counter is set to zero, the second counter is caused to count in the opposite direction, and an input signal to be measured is applied to the first switching means, causing the two counters to continue counting until the second counter reaches the initial state, so that the count in the first counter represents the magnitude of the input signal, the accuracy of which is unaffected by instability and non-linearity of the converter.

References Cited

UNITED STATES PATENTS

| 2,405,597 | 8/1946 | Miller. | |
| 2,835,868 | 5/1958 | Lindesmith | 324—99 |
| 3,359,410 | 12/1967 | Frisby et al. | |

RUDOLPH V. ROLINEC, Primary Examiner

E. F. KARLSEN, Assistant Examiner

U.S. Cl. X.R.

324—99, 130; 340—347